United States Patent [19]

Wittmann

[11] Patent Number: 5,402,686
[45] Date of Patent: Apr. 4, 1995

[54] FLOAT TYPE FLOWMETER
[75] Inventor: Werner Wittmann, Vienna, Austria
[73] Assignee: Wittmann Kunststoffgeräte Ges. M.B.H., Vienna, Austria
[21] Appl. No.: 150,034
[22] PCT Filed: May 4, 1992
[86] PCT No.: PCT/EP92/00965
    § 371 Date: Mar. 21, 1994
    § 102(e) Date: Mar. 21, 1994
[87] PCT Pub. No.: WO92/21005
    PCT Pub. Date: Nov. 26, 1992
[30] Foreign Application Priority Data
    May 13, 1991 [DE] Germany .................. 9106040.0
[51] Int. Cl.6 .................................. G01F 1/22
[52] U.S. Cl. .................................. 73/861.55
[58] Field of Search ............ 73/861.55, 861.56, 861.57

[56]                References Cited
             U.S. PATENT DOCUMENTS

| 2,130,981 | 9/1938 | Fischer et al. ............. 73/861.55 |
| 2,258,023 | 10/1941 | McKernon ................ 73/861.55 |
| 3,974,857 | 8/1976 | Hehl ..................... 73/861.55 X |
| 4,245,513 | 1/1981 | Clements et al. . | |

FOREIGN PATENT DOCUMENTS

| 384167 | 3/1908 | France ................... 73/861.55 |
| 7636539.4 | 11/1976 | Germany . |
| 8323017.3 | 8/1983 | Germany . |
| 3312061 | 10/1983 | Germany . |
| 3417066 | 11/1985 | Germany . |
| 483009 | 1/1970 | Switzerland . |

Primary Examiner—Herbert Goldstein
Attorney, Agent, or Firm—Scully, Scott, Murphy & Presser

[57] ABSTRACT

A float type flowmeter including a bottom flow-through fitting and an upper flow-through fitting in spaced relationship with the bottom flow-through fitting; and an exchangeable measuring tube extending between the fittings. Each fitting has an opening formed as a cylindrical recess in alignment with each other with the openings each receiving a respective opposite end of the measuring tube. An external guide on each end of the measuring tube is in close fit with respectively an adjacent cylindrical recess, thereby facilitating axial movability of the measuring tube within predetermined limits in the longitudinal direction of the measuring tube. A distributor head having mutually communicating axial and radial ducts is located in the upper flow-through fitting closely above the upper end of the measuring tube; and a sealing closure screw operative in conjunction with an axial stop is provided for limiting the vertical axial movement of the measuring tube between the fittings.

2 Claims, 1 Drawing Sheet

FLOAT TYPE FLOWMETER

The invention relates to a float type flowmeter possessing an exchangeable measuring tube which is arranged between a bottom flow-through fitting and a top flow-through fitting.

A meter of this kind is basically already known form DE-OS 3 417 066. In this known meter the measuring tube is held by means of appropriate seals and a clamp means between top and bottom flow-through fittings. The axial contact pressure on the measuring tube is produced by means of a swivelable cam member which transmits the axial pressure to the measuring tube via the clamp means. It is thereby intended to facilitate the replacement of the measuring tubes whose inner walls are soiled by the medium flowing through. The contact pressure is at the same time adjusted by means of an adjusting screw on the cam member. As can be seen from the construction of this known meter, as illustrated in the appertaining figure of the drawings, a relatively large number of parts requiring adjustment to one another are needed. The seating of the measuring tube (on the top and bottom flow-through fittings) has no radial guidance and therefore cannot be regarded as optimum.

From DE-GM 7 637 539 a corresponding meter is known, in which a cap nut is provided at each end of the measuring tube. With the aid of these cap nuts the measuring tube is held between the flow-through fittings. In addition to axial fastening of the measuring tube, radial guidance at the clamping points (on the top and bottom flow-through fittings) is thereby achieved. However, a certain skill is required, particularly for the insertion of the measuring tube, with the cap nuts engaging over it, between the flow-through fittings.

Finally, from DE-GM 8 323 017 a corresponding meter is known, in which the measuring tube is connected to the flow-through fittings by means of bayonet rings. Although the measuring tubes can thus basically be replaced very quickly, here too the insertion of the measuring tube and its fastening between the flow-through tubes nevertheless require a certain skill.

The problem underlying the invention is that of further developing a meter of the type described hereinabove in such a manner that the cost of manufacture for the parts involved in the replacement of the measuring tube is as low as possible and the replacement per se requires no great skill.

The invention is explained below by way of example with reference to the figures of the drawings, in which.

Figure 2:
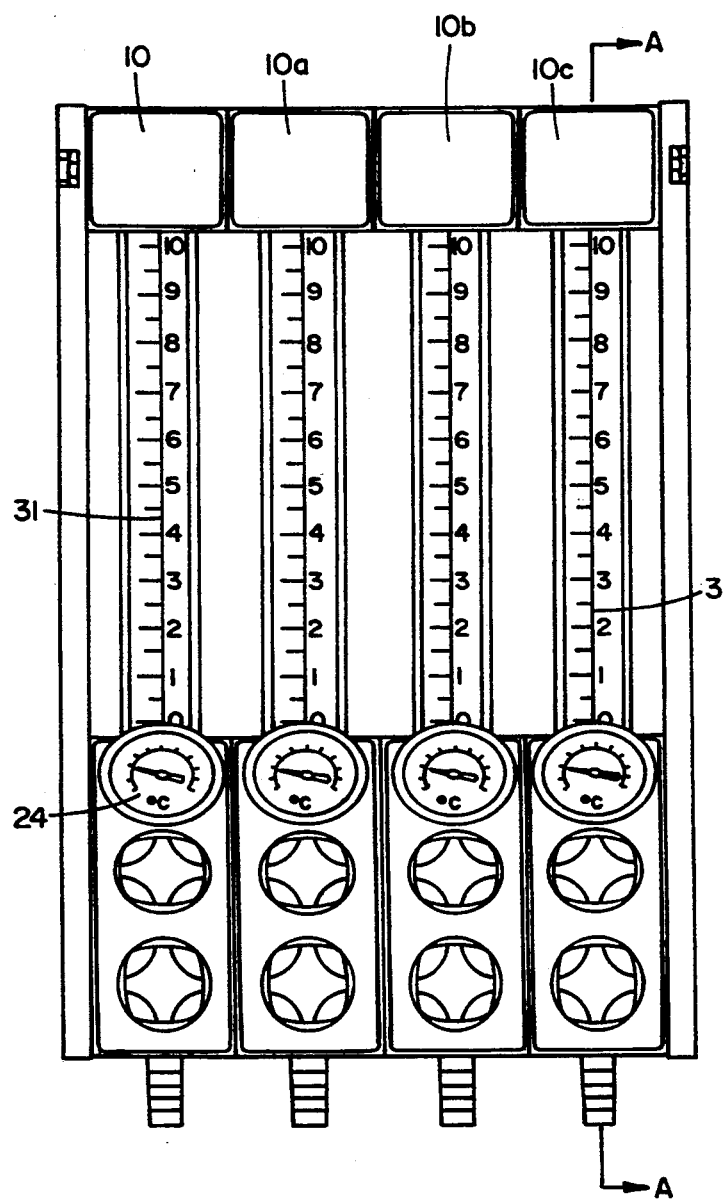
FIG. 2 shows a plurality of individual meters arranged side by side in a row.
Figure 1:
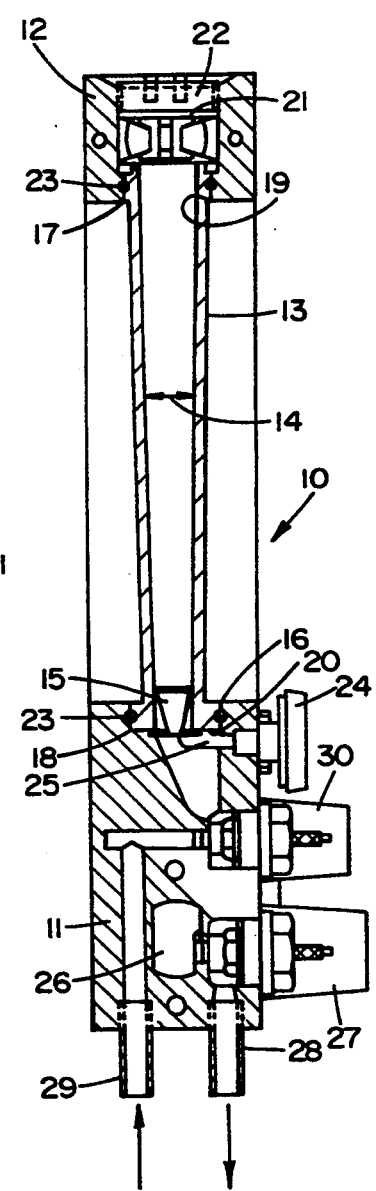
FIG. 1 shows a single meter viewed from the side, in section.

A float type flow meter is frequently used for determining the amount of a coolant flowing per unit of time through an apparatus which is to be cooled, for example an injection mold for plastics. The transparent measuring tube is provided with an inside diameter widening from bottom to top. It is normally disposed on the coolant return side and contains a retaining cone which, in the absence of flow, sinks in the measuring tube to a depth such that it rests either in the downwardly tapered inside diameter of the measuring tube or on a special locking seat. As soon as there is a flow through the measuring tube, the retaining cone is carried upward by the flow. Because of the upwardly widening inside diameter of the measuring tube, the free flow cross-section between the inside wall of the measuring tube and the retaining cone is enlarged until a state of equilibrium is achieved between the lifting forces which the flow produces and the weight of the retaining cone. The height at which this state of equilibrium for the retaining cone is adjusted is a measure of the amount of coolant flowing through per unit of time. Appropriate calibration enables a determined rate of flow per unit of time to be allocated to every height of the retaining cone.

Since each injection mold for plastics which is to be cooled has associated with it a plurality of cooling circuits, for which, depending on cooling requirements, a different rate of flow per unit of time is needed, a plurality of meters of the kind described above are normally arranged directly side by side in a row in the form of a register. The inlets and outlets of all the circuits are in this case grouped together by means of collecting ducts. This is done by means of transverse ducts between the individual meters in the top flow-through fitting for the common outlet, and by means of transverse ducts between the individual meters in the bottom flow-through fitting for the inlet.

The meter 10 consists essentially of a bottom flow-through fitting 11 and a top flow-through fitting 12. Between the two flow-through fittings 11 and 12 a measuring tube 13 is situated, which is made of glass or transparent plastic material and whose clear inside diameter 14 widens conically from bottom to top. The measuring tube 13 contains a retaining cone 15, which in the absence of a coolant flow is held in the bottom part of the measuring tube 13 by the downwardly narrowing inside wall of the measuring tube. However, a special locking seat may also be provided.

Circular cylindrical recesses 16 and 17 respectively, which are in alignment with one another, are provided in the bottom flow-through fitting 11 and the top flow-through fitting 12 and serve to receive the external guides 18 and 19 respectively of the measuring tube 13. The external guides 18 and 19 of the measuring tube 13 carry sealing rings 23 which, despite a complete sealing action, permit a certain longitudinal movability of the measuring tube 13 in the bottom flow-through fitting 11 and the top flow-through fitting 12. The external guide 18 of the measuring tube 13 in the bottom part of the latter can move as far as an axial stop 20 of the bottom flow-through fitting 11.

In the top flow-through fitting 12 a distributor head 21 is arranged above the measuring tube 13 and has both axial and radial ducts, which are in communication with one another. The coolant coming from the measuring tube 13 passes via the axial and radial ducts and also via the transverse ducts between the individual meters 10, 10a, 10b and 10c into the common collecting pipe of all the meters for the outlet.

The axial longitudinal movability of the distributor head 21 and of the measuring tube 13 is limited by means of a closure screw 22 sealingly arranged above the distributor head 21.

The external guides 18 and 19 of the measuring tube 13, which have already been mentioned above, carry sealing rings 23, preferably so-called O-rings.

While the closure screw 22 is being screwed into the top flow-through fitting 12 the distributor head 21 serves at the same time as an intermediary element between the closure screw 22 and the measuring tube 13.

In many cases it is desirable to determine the temperature of the coolant flowing back. For such cases it is possible to provide on the bottom flow-through fitting 11 a thermometer 24 whose temperature probe 25 projects into the returning flow of coolant at a point just below the measuring tube 13.

The path of the coolant is as follows: from a common collecting duct 26 for the flow the coolant passes via a regulating valve 27 into a flow pipe 28, which leads to the apparatus to be cooled, for example the injection mold for plastics. From the mold the coolant returns via a return pipe 29 and is guided, via another regulating valve 30, past the temperature probe 25 of the thermometer 24 to the measuring tube 13, in which it flows upwards and thus carries the retaining cone 15 a determined distance upwards, depending on the rate of flow per unit of time, until a state of equilibrium is achieved between the weight of the retaining cone 13 on the one hand and the lifting forces produced by the flow on the other hand. The higher the rate of flow of coolant, the further the retaining cone 13 is carried upwards. By means of calibration a determined rate of flow can be allocated to every height of the retaining cone 13 and can be read directly with the aid of a scale 31.

For the purpose of cleaning or replacing the measuring tube 13, which is required from time to time, with the meter 10 described above it is only necessary to unscrew the locking screw 22 and to lift the measuring tube 13 upwards out of the top flow-through fitting 12. After the cleaning or replacement of the measuring tube 13, and also, if necessary, of the sealing rings 23 on the external guides 18, 19 of the measuring tube 13, the latter and the distributor head 21 are reinserted from above into the top flow-through fitting 12. The measuring tube is then "floatingly mounted" in the longitudinal (axial) direction between the axial stop 20 and the closure screw 22 or the distributor head 21.

All other parts of the meter 10, which are not described in detail here, are of a configuration known per se.

The particular advantages of the meter 10 described above are the relatively simple arrangement of the measuring tube 13 in two circular cylindrical recesses 16, 17 in alignment with one another, and also the easy and largely unobstructed access to the measuring tube 13 for cleaning or replacement, whereby particular skill for the replacement of the measuring tube is made unnecessary.

I claim:

1. A float type flowmeter including a bottom flow-through fitting and an upper flow-through fitting in spaced relationship with said bottom flow-through fitting; an exchangeable measuring tube extending between said fittings, each said fitting having an opening formed as a cylindrical recess in alignment with each other; said openings each receiving a respective opposite end of said measuring tube; an external guide on each end of said measuring tube in close fit with respectively an adjacent said cylindrical recess facilitating axial movability of said measuring tube within predetermined limits in the longitudinal direction of said measuring tube wherein a sealing ring is arranged in each external guide on said measuring tube; a distributor head having mutually communicating axial and radial ducts being located in the upper flow-through fitting closely above the upper end of said measuring tube; and a sealing closure screw operative in conjunction with an axial stop for limiting the vertical axial movement of the measuring tube between said fittings.

2. A flowmeter according to claim 1, wherein each said sealing ring comprises an O-ring.

* * * * *